March 6, 1951

S. SENSIPER 2,543,809

COUPLING LOOP

Filed Jan. 8, 1946

INVENTOR
SAMUEL SENSIPER
BY
ATTORNEY

Patented Mar. 6, 1951

2,543,809

UNITED STATES PATENT OFFICE 2,543,809

COUPLING LOOP

Samuel Sensiper, Garden City, N. Y., assignor to The Sperry Corporation, a corporation of Delaware Application January 8, 1946, Serial No. 639,725

7 Claims. (Cl. 178—44)

This invention relates to ultra-high-frequency electrical apparatus, and more particularly to coupling loops for transferring electromagnetic energy to and from acivity resonators.

In the past, the method generally used for transferring energy between a transmission line and a cavity resonator has consisted in coupling the line to the resonator by means of a coupling loop. Such a coupling loop consisted essentially of a half circle of wire which protruded into the cavity resonator and had its ends connected to the two legs of the line. The magnetic field, caused by the flow of alternating current through this wire, excited the cavity resonator into oscillation if the dimensions of the cavity resonator were proper to produce resonance at the input frequency and if the plane of the coupling loop were oriented to provide proper coupling to the field to be excited in the resonator. For many applications such a coupling loop was satisfactory. However, in the construction of wave meters of the cavity resonator type, a further limitation was placed upon the performance of such a coupling loop. It is necessary in wave meters that the frequency-indicating device give but a single reading for each frequency of excitation. It has been found that unless wave meters are designed to be excitable in but a single mode, an undesirable ambiguity of indication occurs.

A further cause of ambiguity, especially in cavity resonators which are cylindrical in cross-section, occurs when they are excited in a mode in which the electric field is not circularly symmetric; i. e., where the electric field has a plane of polarization. In such a case, the resonator may be able to sustain oscillations simultaneously with two electromagnetic field figurations of the same type or mode, but with relatively displaced planes or directions of polarization. If the effective resonator dimensions in these two directions of polarizations are different, then the field configurations will be resonant at slightly different frequencies as well as angularly displaced. This can result in multiple response of the indicating device if the wave meter's sensitivity is high enough to respond at both frequencies.

It is, therefore, a major object of this invention to provide an improved coupling device which transfers energy to a cavity resonator and excites the cavity resonator in but a single field configuration of a given mode of oscillation.

A further object of this invention is to provide an arrangement of coupling loops when a plurality of coupling loops are used in a cavity resonator, such that the amplitude of the field configuration of the undesired resonant frequency is minimized and at the same time providing for a large transfer of energy with the desired configuration.

Briefly, according to the present invention, the shape of the coupling loop is changed from the conventional semicircle which protrudes into the cavity resonator, into a shape which is substantially a right angle, one leg of which follows the contour of the cavity resonator, the other leg being an extension of one leg of the coupled line (such as the central conductor of a coaxial line) used to transfer the energy to or from the resonator. Such a coupling device will excite the chamber in such a manner that the electric field has but one plane of polarization. Higher frequency modes of oscillation of the same polarization are prevented by making the dimensions of the resonator such that those modes of oscillation cannot be supported by the resonant chamber.

According to another feature of the invention, two such coupling loops may be used, such as for input and output couplings, respectively, and these loops are so oriented as to minimize further any undesired polarization. Such orientation consists in having the loop legs follow the resonator contour in the same sense (namely, both clockwise or both counterclockwise) from the coaxial line inner conductor.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Although in its preferred embodiment the invention will be described as incorporated in a wave meter, its principles may be extended to other devices in which it is important that the excited electric field have but one plane of polarization.

Figures 1, 3:
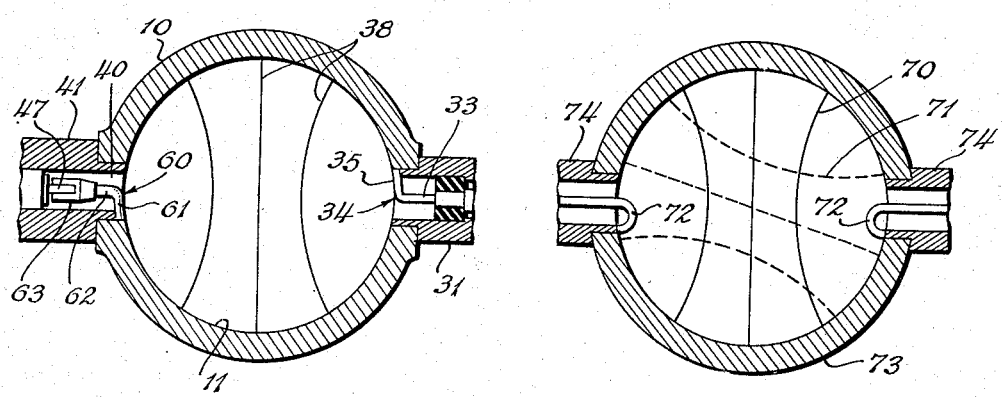
Fig. 1 is a cross-sectional view of a cylindrical cavity resonator excited by conventional coupling loops showing the resulting electric field configuration and useful in explaining the present invention.
Fig. 3 is a cross-sectional view of Fig. 2 taken along line A—A thereof and showing the resulting desirable electric field configuration.

Fig. 1 is a transverse cross-sectional view of a cylindrical resonator 73 having a pair of coaxial transmission lines 74 coupled thereto by conventional semicircular coupling loops 72. In a resonator of this type, a desirable field configuration which may be excited therein is one having transverse electric field lines, as indicated by the lines 70 showing the arrangement of the electric field lines for this mode of oscillation of the resonator. However, the same mode of oscillation can exist in this shape of resonator with a different direction of polarization; that is, with a different orientation of the electric field lines. Such a further field configuration is illustrated by the dotted lines 71 of Fig. 1. For a perfectly cylindrical resonator, the resonant frequencies of the resonator when excited in the two indicated field configurations will be identical. However, should the resonator depart even slightly from a perfectly circular cross-section, the resulting ellipticity can cause one of the field configurations here shown to have a resonant frequency slightly different from that of the other configuration. That is, the frequency at which maximum amplitude of oscillation will occur will be different for the two field configurations shown.

Such additional field configurations of similar mode but different resonant frequencies are highly objectionable, especially where such cavity resonators are utilized as wave meters. For such use of the resonator, one of its transmission lines 74 is coupled to a source of energy of the frequency to be measured. The other transmission line 74 is then connected to a crystal rectifier whose direct-current output actuates a suitable indicator whose indication then corresponds to the amplitude of oscillation of the resonator. The resonant frequency of the resonator is then adjusted until maximum indication is viewed on the indicator.

If the several field configurations illustrated in Fig. 1 can be excited simultaneously within the resonator by the coupling loop 72 and if these configurations have different resonant frequencies, then, as the resonant frequency of the cavity resonator is varied, a peak reading of the meter will occur when field configuration 70 is in resonance with the input and a further peak reading will occur when the field configuration 71 is in resonance with the input. Therefore, at two different adjustments of the wave meter, at least a local maximum reading of the indicator will be obtained, and it will be impossible to calibrate the wave meter directly in terms of frequency without ambiguity.

It has been found that the conventional type of coupling loop illustrated in Fig. 1 produces exactly such ambiguity. It is believed that this is caused by unavoidable minute ellipticity of the resonator cross section encountered during manufacture, and by the nature of the conventional coupling loops. As presently understood, it is believed that the extension of the center conductor of line 74 of Fig. 1 into the resonator cavity acts similarly to a probe, thereby tending to excite the resonator with a field configuration having its plane of polarization extending diametrically between the two coupling loops. Due to the fact that these conductor extensions are not purely radial the plane of polarization is not exactly diametrically between the loops but at some angle thereto as shown at 71 in Fig. 1. However, the loops themselves provide magnetic coupling to the resonator, and excite configuration 70. Hence, the undesirable condition discussed above exists.

The present invention is directed toward improving the construction of wave meters and of cavity resonators by overcoming this undesirable condition by means of a novel design of the coupling loops for the resonator so as to prevent more than one plane of polarization for any mode excited in the resonator. By the apparatus of the present invention, hereinafter described, only the desired configuration, such as 70, is excited within the resonator, and other undesired configurations, of different planes of polarization, even though of the same mode, are substantially suppressed.

Figure 2:
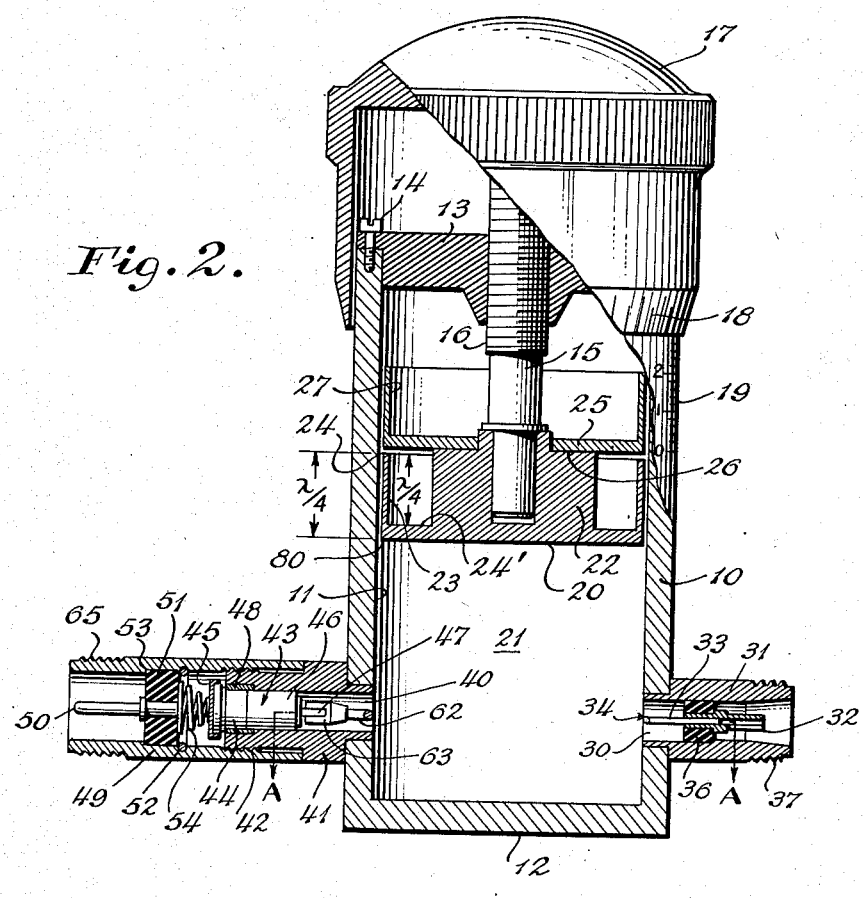
Fig. 2 is a longitudinal view partly in cross section of a cavity resonator type of wave meter embodying the present invention.

The structure of the present novel resonator coupling is illustrated as embodied in a wave meter of the above-discussed type, and is shown in detail in Figs. 2 and 3.

Referring to Fig. 2, a tubular body member 10 having a cylindrical bore 11 is closed at one end by an integral wall 12 and at the other end by a removable wall 13 secured by screws 14 to the tubular body member 10. A spindle 15 is formed with a section 16 threadedly engaging removable wall 13 by means of a connection having relatively fine threads. A micrometer-type barrel 17 is rigidly fixed to the outer end of spindle 15 and carries a scale 18. Scale 19, which is on the outer wall of tubular body member 10, cooperates with scale 18 in a conventional manner to indicate minute longitudinal displacement of spindle 15.

A movable piston member 20 effectively forming one end wall of the resonant chamber 21 formed by bore 11 is mounted on the inner end of spindle 15 by snugly inserting spindle 15 into a relatively thick disc-like portion 22 thereof. This piston member 20 is formed with a cylindrical side wall 23 extending in a direction axially away from the resonant chamber 21. The side wall 23 is parallel to and spaced slightly from the inner face of tubular body member 10 to provide mechanical clearance. Side wall 23 is also spaced from the outer cylindrical face of disc-like portion 22 to form a short-circuited section of coaxial transmission line (or resonant cavity) therewith.

The length of side wall 23 which is parallel to and spaced from the inner face of tubular body member 10 is substantially a quarter of a wavelength substantially in the center of operative range of the wave meter, and the distance from the extreme end of side wall 23 at point 24 to the rear face of piston member 20 at point 24' is substantially electrically equivalent to a similar quarter wavelength, as shown, so that the piston member 20 and the side wall member 23 form a wave trap with body member 10.

The function of this wave trap is to provide an electrical short-circuit between side wall 23 and the inner wall of tubular member 10 without the use of a sliding contact. This is done by the use of the impedance-transforming properties of the wave trap. Since the distance from the outer end of side wall 23 at the point 24 to the rear face of piston member 20 at point 24' is substantially electrically equivalent to one-quarter of the average wavelength in the range for which the wave meter was designed, we have substantially a quarter wave transmission line short-circuited at one end (at 24'), so that the impedance at point 24 looking toward the point 24' is very high, nearly infinite. This very high impedance is effectively connected in series with the impedance viewed at point 24 in a direction away from the resonant cavity 21, so that a resultant very high outward-looking impedance exists at this point. Since the distance from this point 24 to the front face of piston member 20 at point 80 is also substantially electrically equivalent to one-quarter of the average resonant wavelength in the range for which the wave meter is designed, and since the coaxial line formed by walls 11 and 23 has very low characteristic impedance, the very high impedance at point 24 is transformed into an extremely low impedance at point 80, a quarter of a wavelength away, looking toward the point 24. This very low impedance provides the equivalent of a direct electrical short-circuit between the periphery of the front face of piston member 20 and the inner wall of tubular body member 10, at point 80. The efficiency of this electrical short circuit is not changed as the piston member 20 is moved longitudinally inside the tubular body member 10.

It will be understood that this quarter-wavelength distance is not essentially critical within usual practical considerations. The wave meter may have a relatively small operative range, for example, from 5.3 to 6.7 centimeters, and this quarter-wavelength distance could then be equal substantially to one quarter of any of the resonator wavelengths within the wave meter operative range without appreciable difference in practical results. However, for wider ranges of frequency, special provision is made to maintain the short-circuiting characteristic of the wave traps for all frequencies in the wider range, by making the first quarter-wave section between side wall member 23 and disc member 22 have a very large characteristic impedance compared to the second quarter-wave section between side wall member 23 and body member 10. It is possible in this way to make the wave trap relatively free of frequency sensitivity. Essentially this can be done in the case of a cylindrical wave trap of the present type by making the inner and outer radii of the second quarter-wave section both large and approximately equal, and by making the radius of disc member 22 very small compared to the inner radius of side wall member 23. Wavemeters incorporating the wave traps which provide the above-mentioned features are disclosed and claimed in application Serial No. 474,016, filed January 29, 1943, now Patent No. 2,503,256, issued April 11, 1950, in the names of E. L. Ginzton and F. L. Salisbury.

Piston member 25 which rests upon the exposed flat surface 26 of the disc-like portion 22 is preferably substantially a duplicate of piston member 20 and has a side wall 27 also substantially one-quarter wavelength in length which forms a second wave trap functioning similarly to the trap already described for preventing the escape of high frequency electromagnetic energy which might pass beyond piston member 20 and for further reducing the effective impedance at point 80.

An aperture 30 is formed in the wall of tubular body member 10 close to integral wall 12 for rigidly mounting a hollow pipe fitting 31 which carries an insulating bushing 36 within which is fixed a hollow coaxial tube 32 adapted to telescope with the outwardly projecting leg 33 of a stiff-wire, right-angle coupling member 34 which is the subject of this invention. The remaining leg 35 of coupling member 34 extends from the center of the aperture 30 to the inner wall of the hollow fitting 31 and conforms to the contour of the inner face of tubular body member 10. This construction is seen more clearly in Fig. 3, which is a section of the wave meter shown in Fig. 2 taken at line A—A. Bushing 36 aids in supporting projecting leg 33 and in maintaining hollow tube 32 in a coaxial position. Hollow fitting 31, hollow tube 32, and coupling member 34 comprise a concentric transmission line coupling for introducing ultra-high-frequency energy into the chamber 21 of the wave meter or for extracting such energy therefrom. The fitting 31 is provided with threads at 37 for connecting to an input transmission line in any conventional manner.

Diametrically opposite aperture 31 is a second similar aperture 40 in which is rigidly fitted a tubular metal pipe fitting 41 which is provided with threads on its outer wall at 42. Fitting 41 has an internal bore into which extends a crystal detector cartridge 43. This crystal detector cartridge 43 is of well-known construction comprising a metal base 44 with metal cap 45, and insulator body 46 and metal probe or terminal 47. The cartridge 43 is frictionally fitted into an insulating bushing 48 which insulates the metal base 44 and metal cap 45 of the cartridge 43 from the fitting 41. At the same time, this insulating bushing 48 serves as the dielectric member of a by-pass condenser which minimizes leakage of ultra-high-frequency energy past the cartridge 43.

A second hollow metal fitting 49 is threadedly connected at 42 to metal fitting 41. A conducting probe 50 is fitted in an insulating bushing 51 which fits snugly inside fitting 49 against shoulder 53 and is held in place by snap ring 52 fitting into a groove in fitting 49. A spring 54 is compressed between the enlarged inner end of conducting probe 50 and metal cap 45 of crystal detector cartridge 43 when fitting 49 is threaded tightly to fitting 41.

The pickup antenna 60 is shaped as a right angle similar to input antenna 34. One leg 61 of this right-angle antenna 60, as is more clearly seen in Fig. 3, is rigidly fastened to inner wall of hollow fitting 41 and conforms to the contour of bore 11 of tubular body member 10. The axially projecting leg 62 is terminated in a hollow tubular member 63 into which metal terminal 47 of crystal detector cartridge 43 fits snugly. External threads at 65 on fitting 49 are provided for fastening a transmission line thereto. Such a line may be connected to an output indicating device, which for convenience may be a milliammeter.

In operation, the ultra-high-frequency energy, whose wave length is to be measured, is introduced by the input line and input coupling member 34 into chamber 21, where standing waves are set up. The resulting electric field configuration is shown in cross section by the solid lines 38 in Fig. 2, similar to the desired configuration 70 of Fig. 1. To determine the wave length of these standing waves, spindle 15 is axially adjusted through rotation of micrometer barrel 17 until the output indicating device connected to fitting 49 shows a maximum reading. This occurs when the chamber 21 is of such dimensions as to be resonant at the input frequency. From the reading of micrometer scales 18 and 19, the wave length of the input energy may be determined as if the wave meter has been previously calibrated. If desired, these scales 18 and 19 may be calibrated to read directly in wave length.

By the use of a coupling member shaped as shown in Fig. 3, a decided improvement is realized over the conventional coupling shown in Fig. 1. In the flat right-angle coupling member 34, the axial projecting leg 33 is essentially shielded by the outer conductor or fitting 31, which materially reduces its ability to excite the chamber in an undesired manner.

It should be further pointed out that placing the input and output coupling members in the same sense around the cavity resonator, as is shown in Fig. 3, results in further lowering any excitation of the field of undesired plane of polarization, as compared with having the loops in the opposite sense.

Thus, with the use of the improved coupling member or loop of the present invention and by placing these loops in the same sense as has been discussed, it is possible to maintain a difference of at least 40 decibels between the amplitudes of desired and undesired fields excited by the present improved coupling. Such difference, of course, removes any practical possibility of ambiguity of indication wave meters.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A cylindrical-shaped cavity resonator having a longitudinal axis and adapted to contain an oscillating electromagnetic field having a predetermined plane of polarization, an input coupling member and an output coupling member, each of said members being formed substantially in the shape of a right angle and having one of its legs disposed along a line tangent to the cylindrical wall of said cavity resonator, said leg being disposed in a plane perpendicular to said longitudinal axis of said cavity, and each of said members having a remaining leg projecting outward from the said cavity resonator, said coupling members being positioned exteriorly of said cavity resonator.

2. A cylindrical-shaped cavity resonator having a longitudinal axis and adapted to contain an oscillating electromagnetic field having a predetermined plane of polarization, a tubular fitting communicating with said chamber through the wall thereof, and a coupling member for said resonator entirely contained within said tubular fitting, said coupling member comprising two legs in substantially right angle arrangement disposed transversely to said longitudinal axis, one of said legs being disposed along the contour of the wall of said chamber and being fixed at its free end to the inner wall of said tubular fitting, whereby undesired planes of polarization of said field are suppressed.

3. A cylindrical-shaped cavity resonator having a longitudinal axis and adapted to contain an oscillating electromagnetic field having a plane of polarization, an opening in the wall of said resonator, and a coupling member formed of two legs positioned exteriorly of said cavity resonator, the first of said legs having its free end fixed to the periphery of said opening and being disposed along a line tangent to the wall of said cavity resonator, said legs being disposed perpendicularly to said longitudinal axis of said cylinder, the second of said legs extending outward from said cavity resonator.

4. An ultra-high-frequency wavemeter comprising a hollow cylindrical body member having a longitudinal axis and closed at one end, a movable end wall axially adjustable within said cylindrical member for altering the volume of the cylindrical space confined thereby, said space being adapted to contain oscillating electromagnetic fields resonant therein and forming a resonant cavity, a tubular fitting mounted at an opening in the wall of said member and means cooperating with said fitting for exciting said resonant cavity in a mode of oscillation having transverse electric field lines of predetermined plane of polarization, said last-named means comprising a coupling member disposed in a plane perpendicular to said longitudinal axis of said cylindrical body member and having a first leg extending perpendicularly to said axis in said fitting and a second leg extending along a line tangent to the inner circular surface of said body member and connected at one end to said body member at the edge of said opening and at the other end to said first leg whereby, upon excitation of said coupling member, said resonant cavity will be excited in a transverse electric field mode having a plane of polarization substantially perpendicular to said first leg.

5. An ultra-high frequency wavemeter, comprising a hollow cylindrical-shaped cavity chamber adapted to support an oscillating electromagnetic field having a predetermined plane of polarization, said chamber having a longitudinal axis and also having an opening in the cylindrical wall portion thereof, a tubular fitting mounted externally of said chamber at said opening, means contained entirely within said fitting and cooperating therewith for coupling external apparatus to said chamber, said means including a first leg extending concentrically within said tubular fitting, and a second leg extending from said first leg along a line tangent to the cylindrical wall of said chamber in a plane perpendicular to said longitudinal axis of said cavity chamber, said second leg having one end thereof terminating at said first leg and the other end thereof terminating at the inner surface of said fitting, whereby coupling between said first leg and said chamber is negligible compared to the coupling between said chamber and said second leg, and means for adjustably altering the volume of said chamber.

6. A device as defined in claim 5, further including a second tubular fitting mounted externally of said cavity chamber at a second opening in the cylindrical wall portion thereof, second means contained entirely within said fitting and cooperating therewith for coupling further external apparatus to said chamber, including first and second legs arranged in a manner similar to said first and second legs of said first means for coupling, both of said second legs being directed in the same sense around the cylindrical wall of said cavity chamber, and said first legs being disposed in a plane containing said longitudinal axis.

7. An ultra-high frequency wavemeter, comprising a cylindrical-shaped cavity chamber adapted to support an oscillating electromagnetic field having a predetermined plane of polarization, said chamber having a longitudinal axis and also having an opening in the wall thereof, a tubular fitting mounted externally of said chamber and communicating therewith by way of said opening, means positioned exteriorly of said chamber and cooperating with said fitting for coupling external apparatus to said chamber, said means comprising a bent conducting member having a first portion extending along the axis of said tubular fitting and a second portion extending to and contacting with said tubular fitting and the inner surface of said cavity chamber, said bent conducting member being disposed in a plane perpendicular to said longitudinal axis, whereby coupling between said chamber and said first portion is substantially negligible as compared to the coupling between said chamber and said second portion.

SAMUEL SENSIPER.

REFERENCES CITED

The following references are of record in the file of this patent:

UNITED STATES PATENTS

| Number | Name | Date |
|---|---|---|
| 2,311,520 | Clifford | Feb. 16, 1943 |
| 2,365,207 | Moles | Dec. 19, 1944 |
| 2,373,233 | Dow | Apr. 10, 1945 |
| 2,400,777 | Okress | May 21, 1946 |
| 2,405,814 | Brannin | Aug. 13, 1946 |
| 2,414,456 | Edson | Jan. 21, 1947 |
| 2,439,388 | Hansen | Apr. 13, 1948 |
| 2,474,485 | Mason | June 28, 1949 |